(12) United States Patent
Chai et al.

(10) Patent No.: US 8,244,680 B2
(45) Date of Patent: *Aug. 14, 2012

(54) ACTIVE DIRECTORY CONTAINER RECOVERY

(75) Inventors: Mu Chai, Bellevue, WA (US); Anand Raj, Cochin (IN); Gururaj M. Jayaram, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/834,535

(22) Filed: Jul. 12, 2010

(65) Prior Publication Data

US 2010/0281002 A1  Nov. 4, 2010

Related U.S. Application Data

(63) Continuation of application No. 11/967,900, filed on Dec. 31, 2007, now Pat. No. 7,774,314.

(51) Int. Cl.
*G06F 17/30* (2006.01)
(52) U.S. Cl. ...................................................... 707/640
(58) Field of Classification Search .............. 707/2, 640; 709/223
See application file for complete search history.

(56) References Cited

U.S. PATENT DOCUMENTS

| 6,496,944 | B1 | 12/2002 | Hsiao et al. |
| 7,330,997 | B1 | 2/2008 | Odom |
| 7,774,314 | B1 * | 8/2010 | Chai et al. ..................... 707/640 |
| 2005/0165833 | A1 | 7/2005 | Nanda et al. |
| 2007/0027898 | A1 | 2/2007 | Jones et al. |
| 2007/0214197 | A1 | 9/2007 | Bolik et al. |

OTHER PUBLICATIONS

U.S. Appl. No. 11/967,900, filed Dec. 31, 2007, Chai.
U.S. Appl. No. 11/967,900, Mail Date Feb. 23, 2010, Office Action.
U.S. Appl. No. 11/967,900, Mail Date Jun. 13, 2010, Notice of Allowance.

* cited by examiner

*Primary Examiner* — Etienne Leroux
(74) *Attorney, Agent, or Firm* — Workman Nydegger

(57) ABSTRACT

Methods and systems for performing rapid recovery of deleted object in Active Directory. The invention allows automated recovery of any object at any point in an Active Directory hierarchy. In one embodiment, the method for recovering a deleted object includes determining whether the object of interest is contained in the tombstone and, if not, recursively evaluating higher-order parent nodes until a parent node is found that exists in the tombstone. The object of interest can then be reanimated and its attributes automatically restored as well as those for all of the children of the object of interest.

20 Claims, 3 Drawing Sheets

ACTIVE DIRECTORY CONTAINER RECOVERY

This patent application is a continuation of U.S. patent application Ser. No. 11/967,900, filed Dec. 31, 2007, which application is fully incorporated herein by reference in its entirety.

BACKGROUND OF THE INVENTION

1. The Field of the Invention

The present invention relates to backup and recover operations. More particularly, the present invention relates to rapid recovery of an active directory container object and/or its children.

2. The Relevant Technology

Active Directory is a directory service used to store information about network resources across a domain. Its main purpose is to provide central authentication and authorization services for Windows-based computers. Active Directory also allows administrators to assign policies, deploy software, and apply critical updates to an organization. Active Directory stores information and settings in a central database.

An Active Directory structure is a hierarchical framework of objects. The objects fall into three broad categories: resources (e.g. printers), services (e.g. e-mail) and users (e.g., user accounts and groups). The Active Directory provides information on the objects, organizes the objects, controls access and sets security. Certain objects can also be containers of other objects. An object is uniquely identified by its name and has a set of attributes—the characteristics and information that the object can contain—defined by a schema, which also determines the kind of objects that can be stored in the Active Directory.

Typically, the highest object in the hierarchy is the domain. The domain can be further sub-divided into containers called Organizational Units. Organizational units give a semblance of structure to the organization either based on administrative structure or geographical structure. The organizational unit is the common level at which to apply group policies, which are Active Directory objects themselves called Group Policy Objects. Policies can also be applied to individual objects or attributes as well as at the site level (i.e., one or more IP subnets).

In Active Directory, every object has a Distinguished Name. For example, an object called "container1" in the domain "guru.com," would have the distinguished name: /DC=guru,DC=com/CN=Users/CN=container1.

When a container object is deleted from Active Directory, all its children in this hierarchical sub branch are removed as well. When Active Directory deletes an object from the directory, it does not physically remove the object from the database. Instead, Active Directory marks the object as deleted by setting the object's isDeleted attribute to TRUE, stripping most of the attributes from the object, renaming the object, and then moving the object to a special container in the object's naming context (NC) named CN=Deleted Objects. The object, now called a tombstone, is invisible to normal directory operations and is set to be deleted at a later point in time.

Up until the object is actually deleted from the database, a deleted object can be recovered. However, in order to recover, for example, one of the children of the container object, the user is required to know the distinguished name of the object. When the child is placed in the repository, the distinguished name is changed, making it difficult for a user to find a child item and restore it. In addition, if a user is able to restore an object, the attributes of the object must be recovered separately.

Where an Active Directory can be quite complex, varying from a small installation with a few hundred objects, to a large installation with millions of objects, with potentially many levels of hierarchy, it would be advantageous to be able to recover a container and its children at any depth.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
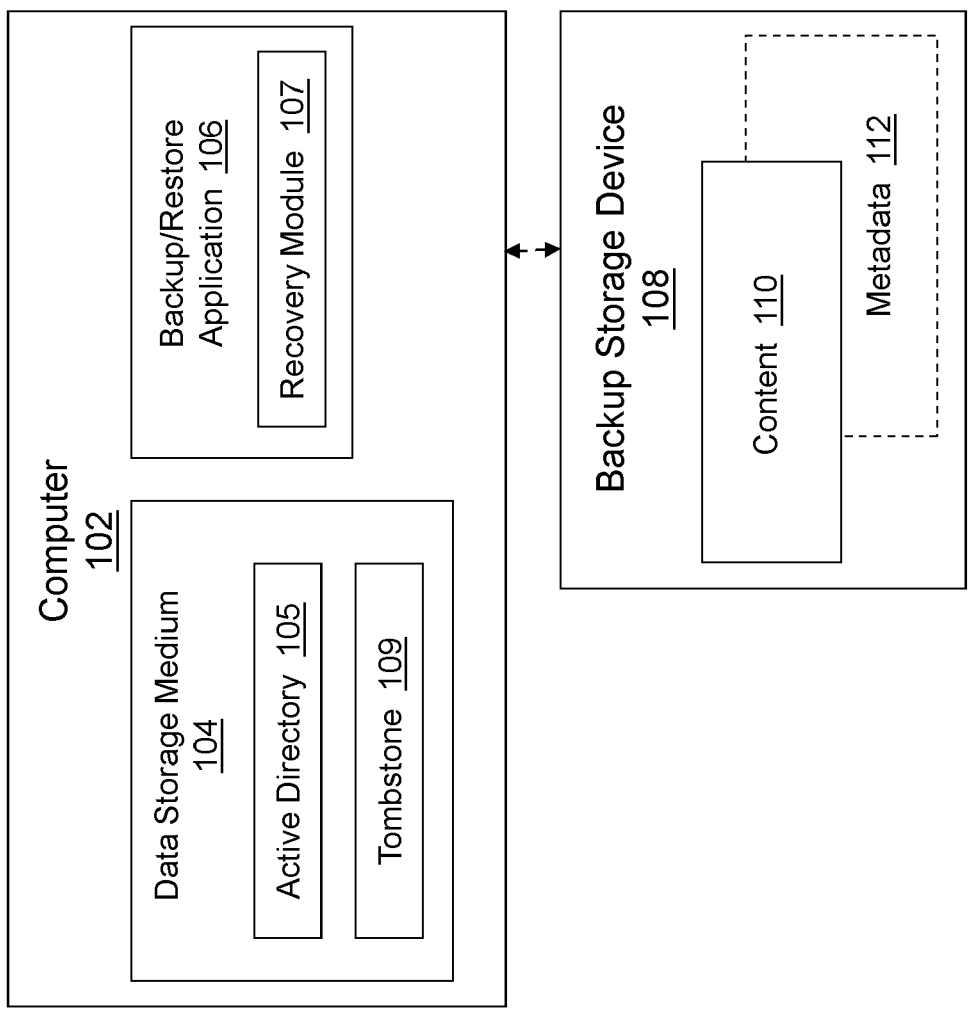
FIG. 1 is a block diagram of an exemplary network environment for performing backup and recovery of Active Directory objects.

The present invention allows a user to recover an object in Active Directory from any point in a section of hierarchy that has been deleted so long as that section still exists in the tombstone state. FIG. 1 illustrates an exemplary network system 100 for performing methods of the present invention. A computer 102 resides on the system having a data storage medium 104 containing content for backup. For example, Active Directory 105 is an example of data that can be stored on data storage medium 104. The data storage medium 104 may also store other attributes or information about the content. A backup/restore application 106 resides on the computer that enables a user to backup data on the data storage medium 104 at prescheduled times or on an ad hoc basis. The backup/restore application includes a recovery module 107 that enables a user to recover objects in the active directory.

Using a backup/restore application, data about active directory 105 is copied from the data storage medium 104 and backed up to a backup storage device 108. This can include backing up one or more container objects of the active directory and any children. Various backup/restore applications are known and the exact backup/restore product is not essential and will not be discussed in detail so as not to obscure the present invention. Generally, however, the backup/restore application will be able to backup both the content 110 of data from the data storage medium 104 as well as metadata 112 associated therewith.

When an object is deleted from active directory 105, the data is flagged for deletion, attributes changed, and distinguished name changed. Hence, tombstone 109 refers to active directory objects that have been deleted, but have not yet been purged from the data storage medium 104.

At some point before an object in Active Directory is deleted, a backup is made of the Active Directory to backup storage 108. The following is an example representing the items in the sub branch defined by the container labeled "Container1" that could be copied to backup storage.

/DC=guru,DC=com/CN=Users/CN=container1
/DC=guru,DC=com/CN=Users/CN=container1/CN=user1
/DC=guru,DC=com/CN=Users/CN=container1/CN=container2
/DC=guru,DC=com/CN=Users/CN=container1/CN=container2/CN=user2
/DC=guru,DC=com/CN=Users/CN=container1/CN=container2/CN=container3

Figure 2:
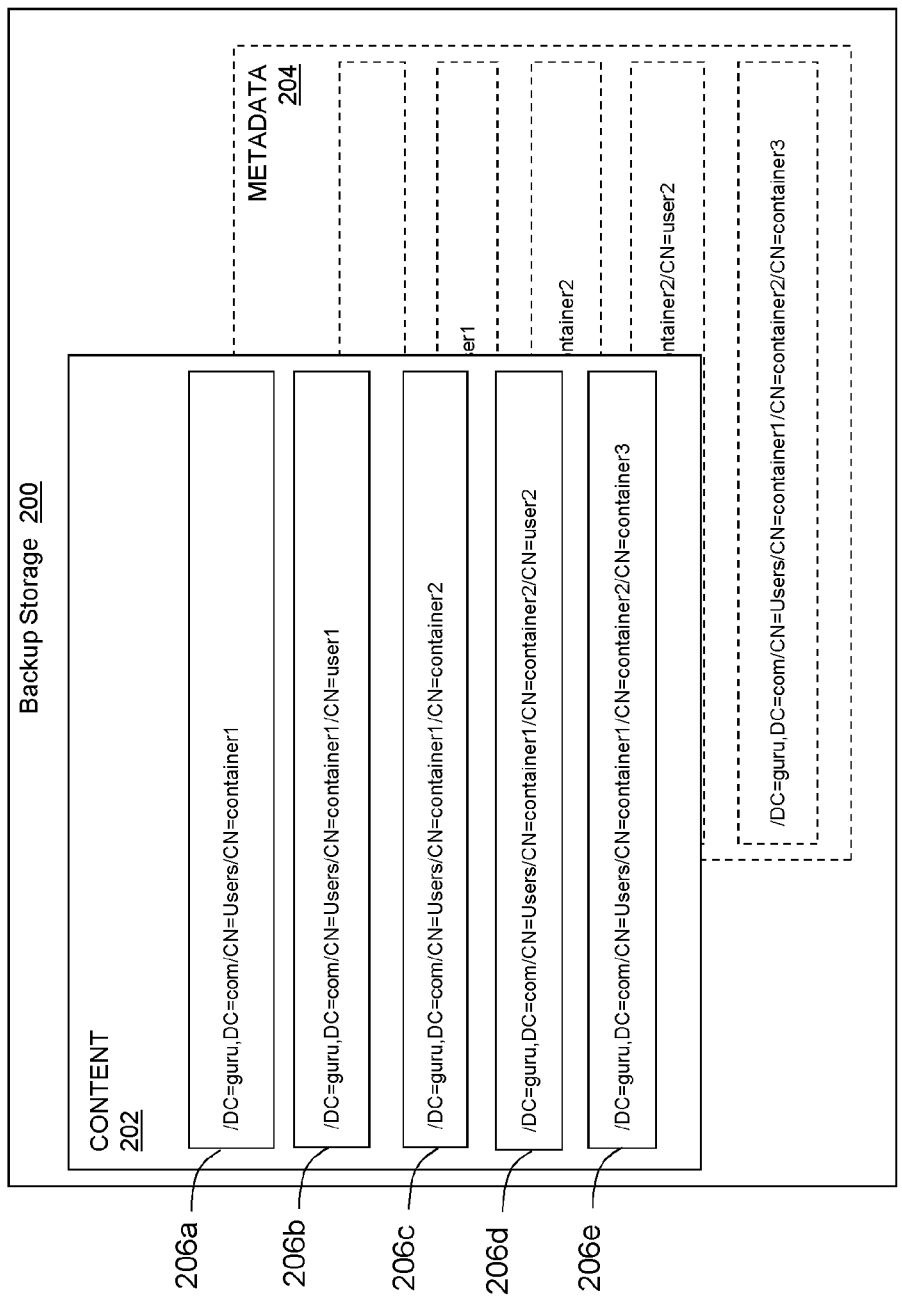
FIG. 2 is a block diagram of an exemplary backup storage of Active Directory objects.

FIG. 2 represents that this section of the Active Directory has been copied to a backup storage 200. Backup storage 200 includes the content 202 and metadata 204 for each object 206a through 206e. The metadata 204 includes the attributes for each object as well as an object index. Thus, backing up "container1" means to backup the contents and attributes of /DC=guru,DC=com/CN=Users/CN=container1 (object 206a) as well as those of all its children (object 206b through 206e). The index in the metadata 204 can be reconstructed to form the sub-tree structure at restore time.

When one of the objects is deleted from the Active Directory, the Active Directory marks the object as deleted by setting the object's isDeleted attribute to TRUE, stripping most of the attributes from the object, renaming the object, and then moving the object to a special container in the object's naming context (NC) named CN=Deleted Objects. The object, now called a tombstone, is invisible to normal directory operations and is set to be deleted at a later point in time. The deleted object in the tombstone state is associated with the distinguished name of the original object in the active directory by its 'original name' property. However, the object's 'original name' can change if its parent is also deleted from the active directory, making it difficult for administrators to recover an object whose parent has also been marked for deletion. As long as the deleted object is still in the tombstone state, the present invention provides for automated recovery of deleted objects at any point in the hierarchy. When a container object is deleted from the active directory, any children of the container object are also deleted.

Generally, the recovery process includes reanimating the deleted object to the active directory and recovering the non-system attributes to the reanimated object to generate a fully recovered object. A recovery module can reside on a backup/recovery application to enable recovery of Active Directory objects, as shown in FIG. 1. Or, the recovery module could reside on an operating system of a computer, so long as the recovery module is able to access tombstone 109 and backup storage device 108.

Figure 3:
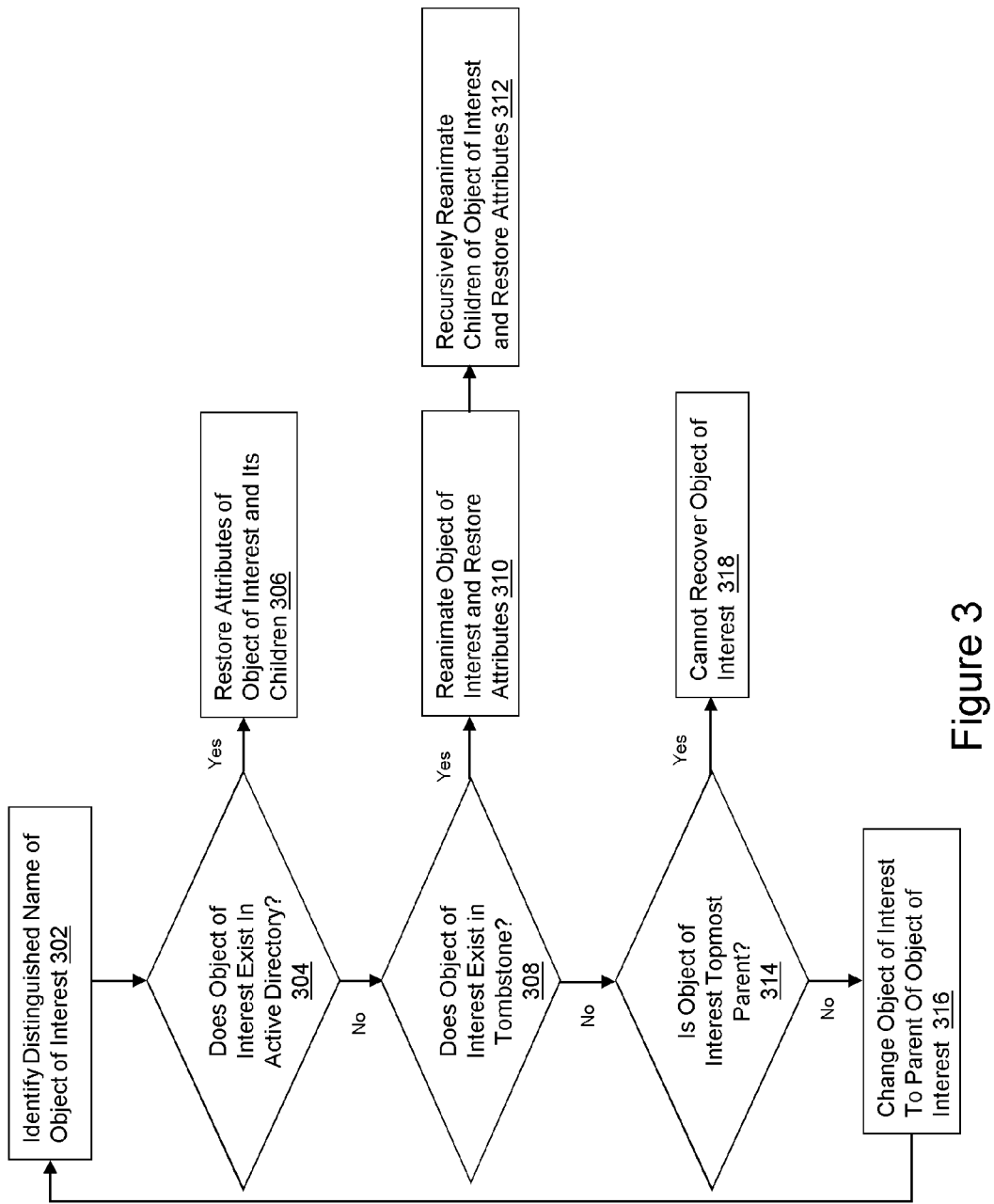
FIG. 3 is a flow diagram of an exemplary method for recovering deleted Active Directory objects.

FIG. 3 illustrates an exemplary method for recovering a deleted container object. At 302, the recovery module identifies the distinguished name of the object of interest. As will be described below, if the object of interest is not recoverable, the invention uses a recursive process to identify an object higher in the hierarchy than the object of interest that is recoverable. So, the first time the process is implemented, the object of interest is the object selected by the user for recovery. In subsequent recursive passes, the object of interest is a higher-order parent object in the hierarchy tree in which the object selected for recovery exists. Identifying the distinguished name of the object of interest can include accessing the backup storage device to access metadata. The metadata includes the object index for each deleted object. The recovery module uses the object index to reconstruct the distinguished name of the object of interest. As noted above, even if the recovery module is able to identify the distinguished name of the object, the distinguished name may not be the same as the distinguished name of the object in the tombstone. That is because the 'original name' of the object can change when the object is deleted and placed in the tombstone.

At 304, the recovery module accesses the active directory 105 to determine whether the object of interest is in the active directory. At 306, if the object of interest exists in the active directory, it is possible that attributes of the object of interest have been lost, so the recovery module restores the attributes of the object of interest and all its children from the backup storage device 108. As mentioned above, the attributes of the active directory objects are backed up in metadata 204 of backup storage 200.

At 308, if the object of interest does not exist in the active directory, the recovery module determines whether the object of interest exists in the tombstone. If the object of interest exists in the tombstone, at 310, the recovery module reanimates the object to the active directory and restores the attributes of the object of interest. Since many of the attributes are stripped from the object at the time of deletion, this recovers only a bare-bone version of the object with the attributes that have not been stripped. Thus, 310 also includes identifying attributes from the metadata 204 for the object in the backup storage 200 and restoring these attributes as well, providing full recovery of the object. Then, at 312, the recovery module repeats the reanimation and recovery steps recursively for all the children of the object of interest.

If the object of interest is not in the tombstone, the recovery module determines, at 314, whether the object of interest is the topmost parent object. If the object of interest is not the topmost parent, at 316, the recovery module changes the object of interest to be the parent of the object of interest. The process then proceeds back to 302 to attempt to recover the parent of the object of interest, which, recursively, will recover the object selected by the user for recovery.

At 318, if none of the ancestors are found in the tombstone, the object of interest has already expired its retention period in the tombstone state, and has been purged from the tombstone and can no longer been restored.

Applying the above method to FIG. 2, when "container1" is deleted from the active directory, assume that the user wants to recover "container2" which is in the middle of the hierarchy tree. The process first determines whether "container2" exists in the Active Directory. However, the process will return a "false" since "container2" has been deleted from Active Directory. The process will then determine whether "container2" is in the tombstone using the 'original name' property of the tombstone object. Since the parent of the "container2", "container1," is also deleted, the process will not find "container2" in the tombstone.

The process then recursively walks up the index and find the parent "container1". The process checks the Active Directory for "container1," but since "container1" has been deleted, the process will return a "false." The process will then check the tombstone for "container1." Since "container1" is identifiable by the 'original name' property of the tombstone object, the process will find "container1," reanimate it and restore all its attributes. In the process of reanimating "container1," all of the original distinguished names of the children are restored, so it is possible to also reanimate child "container2", and restore all its attributes. The same is performed for all descendants of "container1."

Advantageously, the above methods allow for efficient restoration of a deleted object from the Active Directory as long as the deleted object hasn't been purged from the tombstone. The present invention is also extensible to any Active Directory of any complexity since it uses recursive operations to identify recoverable parent objects if a child object is not identifiable by its distinguished name. In addition, the invention provides for automated recovery of the attributes of the object at the time the object is reanimated, thus reducing time and effort required by users to recover objects in the Active Directory.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recovering objects comprising:
   identifying a distinguished name of an object of interest from a backup storage device, the object of interest having been previously deleted from an active directory and the attributes stripped from the object;
   determining whether the object of interest exists in the active directory using the distinguished name of the object of interest;
   if the object of interest does not exist in the active directory, determining whether the object of interest exists in a tombstone state using the distinguished name of the object of interest;
   if the object of interest does not exist in the tombstone state, determining whether the object of interest is a topmost parent in the active directory; and
   if the object of interest is not the topmost parent, recovering an immediate parent of the object of interest, including:
      determining that the immediate parent exists in a tombstone state;
      reanimating the immediate parent and automatically restoring attributes of the immediate parent from the backup storage device;
      identifying any children of the immediate parent including the object of interest; and
      reanimating the children of the immediate parent and automatically restoring attributes of the children of the immediate parent from the backup storage device.

2. The method of claim 1, wherein if the object of interest does exist in the active directory, further comprising restoring attributes of the object of interest and its children from the backup storage device.

3. The method of claim 2, wherein restoring attributes of the object of interest comprises accessing a backup storage containing attributes of the object of interest.

4. The method of claim 1, wherein if the object of interest does exist in the tombstone state, further comprising:
   reanimating the object of interest and automatically restoring attributes of the object of interest from the backup storage device;
   identifying any children of the object of interest; and
   reanimating the children of the object of interest and automatically restoring attributes of the children of the object of interest from the backup storage device.

5. The method of claim 1, wherein reanimating the immediate parent and automatically restoring attributes of the immediate parent comprises accessing a backup storage containing attributes of the immediate parent.

6. The method of claim 1, wherein recovering an immediate parent of the object of interest further includes, prior to determining that the immediate parent exists in a tombstone state:
   identifying a distinguished name of the immediate parent from the backup storage device; and
   determining, using the distinguished name of the immediate parent, that the immediate parent does not exist in the active directory.

7. The method of claim 6, wherein identifying a distinguished name of the immediate parent comprises accessing an object index in backup storage.

8. A system comprising:
a backup storage device;
a data storage medium containing content that is backed up to the backup storage device, the content including an active directory and a tombstone including active directory objects that have been deleted but not purged from the data storage medium; and
a backup/restore application configured to backup content from the data storage medium to the backup storage device; and
a recovery module configured to:
  identify a distinguished name of an object of interest from the backup storage device, the object of interest having been previously deleted from an active directory and the attributes stripped from the object;
  determine whether the object of interest exists in the active directory using the distinguished name of the object of interest;
  if the object of interest does not exist in the active directory, determine whether the object of interest exists in a tombstone state using the distinguished name of the object of interest;
  if the object of interest does not exist in the tombstone state, determine whether the object of interest is a topmost parent in the active directory; and
  if the object of interest is not the topmost parent, recover an immediate parent of the object of interest, including:
    determine that the immediate parent exists in a tombstone state;
    reanimate the immediate parent and automatically restore attributes of the immediate parent from the backup storage device;
    identify any children of the immediate parent including the object of interest; and
    reanimate the children of the immediate parent and automatically restore attributes of the children of the immediate parent from the backup storage device.

9. The system of claim 8, wherein the recovery module resides on the backup/recovery application.

10. The system of claim 8, wherein the recovery module resides on an operating system of a computer.

11. A physical computer-readable medium comprising computer executable instructions executable by a computer to perform operations comprising:
  identifying a first distinguished name of an object of interest from a backup storage device, the object of interest having been previously deleted from an active directory and the attributes stripped from the object;
  attempting to recover the object of interest using the first distinguished name;
  if the object of interest is not recoverable using the first distinguished name and if the object of interest is not a topmost parent in the active directory, identifying a second distinguished name of an immediate parent of the object of interest; and
  attempting to recover the immediate parent using the second distinguished name.

12. The physical computer-readable medium of claim 11, wherein attempting to recover the object of interest using the first distinguished name comprises:
  determining whether the object of interest exists in the active directory using the first distinguished name of the object of interest;
  if the object of interest does not exist in the active directory, determining whether the object of interest exists in a tombstone state using the first distinguished name of the object of interest;
  if the object of interest exists in the tombstone state, reanimating the object of interest and automatically restoring attributes of the object of interest from the backup storage device;
  identifying any children of the object of interest; and
  reanimating the children of the object of interest and automatically restoring attributes of the children of the object of interest from the backup storage device.

13. The physical computer-readable medium of claim 11, wherein attempting to recover the immediate parent using the second distinguished name comprises:
  determining whether the immediate parent exists in the active directory using the second distinguished name of the immediate parent;
  if the immediate parent does not exist in the active directory, determining whether the immediate parent exists in a tombstone state using the second distinguished name of the immediate parent;
  if the immediate parent exists in the tombstone state, reanimating the immediate parent and automatically restoring attributes of the immediate parent from the backup storage device;
  identifying any children of the immediate parent; and
  reanimating the children of the immediate parent and automatically restoring attributes of the children of the immediate parent from the backup storage device.

14. The physical computer-readable medium of claim 11, wherein identifying a first distinguished name of the object of interest or identifying a second distinguished name of the immediate parent comprises accessing an object index in backup storage.

15. A system comprising:
a backup storage device;
a data storage medium containing content that is backed up to the backup storage device, the content including an active directory and a tombstone including active directory objects that have been deleted but not purged from the data storage medium; and
a backup/restore application configured to backup content from the data storage medium to the backup storage device, the backup/restore application including a recovery module comprising computer-executable instructions executable by a computer to perform operations comprising:
  identifying a distinguished name of an object of interest from the backup storage device, the object of interest having been previously deleted from the active directory and the attributes stripped from the object;
  determining whether the object of interest exists in the active directory using the distinguished name of the object of interest;
  if the object of interest does not exist in the active directory, determining whether the object of interest exists in the tombstone using the distinguished name of the object of interest;
  if the object of interest exists in the tombstone state, reanimating the object of interest and automatically restoring attributes of the object of interest from the backup storage device;
  identifying any children of the object of interest; and
  reanimating the children of the object of interest and automatically restoring attributes of the children of the object of interest from the backup storage device.

16. The system of claim 15, wherein if the object of interest does exist in the active directory, the recovery module comprises further computer-executable instructions executable by a computer to perform operations comprising restoring attributes of the object of interest and its children from the backup storage device.

17. The system of claim 16, wherein restoring attributes of the object of interest comprises accessing a backup storage containing attributes of the object of interest.

18. A physical computer-readable medium comprising computer executable instructions executable by a computer to perform operations comprising:

identifying a distinguished name of an object of interest from a backup storage device, the object of interest having been previously deleted from an active directory and the attributes stripped from the object;

using the distinguished name of the object of interest, determining whether the object of interest exists in the active directory;

if the object of interest does not exist in the active directory, using the distinguished name of the object of interest, determining whether the object of interest exists in a tombstone state;

if the object of interest exists in the tombstone state, reanimating the object of interest and automatically restoring attributes of the object of interest from the backup storage device;

identifying any children of the object of interest; and reanimating the children of the object of interest and automatically restoring attributes of the children of the object of interest from the backup storage device.

19. The physical computer-readable medium of claim 18, wherein reanimating the object of interest and automatically restoring attributes of the object of interest from the backup storage device comprises accessing a backup storage containing attributes of the object of interest.

20. The physical computer-readable medium of claim 18, wherein identifying a distinguished name of an object of interest comprises accessing an object index in a backup storage.

* * * * *